(12) United States Patent
Cheng et al.

(10) Patent No.: US 9,606,531 B2
(45) Date of Patent: Mar. 28, 2017

(54) DECENTRALIZED INDUSTRIAL PROCESS SIMULATION SYSTEM

(75) Inventors: Xu Cheng, Pittsburgh, PA (US); Richard W. Kephart, Kittanning, PA (US); Cheng T. Wen, Pittsburgh, PA (US); B. Erik Ydstie, Allison Park, PA (US)

(73) Assignee: EMERSON PROCESS MANAGEMENT POWER & WATER SOLUTIONS, INC., Pittsburgh, PA (US)

(*) Notice: Subject to any disclaimer, the term of this patent is extended or adjusted under 35 U.S.C. 154(b) by 1121 days.

(21) Appl. No.: 12/628,821

(22) Filed: Dec. 1, 2009

(65) Prior Publication Data

US 2011/0131017 A1 Jun. 2, 2011

(51) Int. Cl.
*G06G 7/48* (2006.01)
*G05B 19/418* (2006.01)

(52) U.S. Cl.
CPC ........... *G05B 19/41885* (2013.01); *G05B 2219/32345* (2013.01); *G05B 2219/32357* (2013.01); *Y02P 90/18* (2015.11); *Y02P 90/26* (2015.11)

(58) Field of Classification Search
CPC .................................................. G05B 15/02
USPC ............................................................ 703/6
See application file for complete search history.

(56) References Cited

U.S. PATENT DOCUMENTS

| 6,907,383 | B2* | 6/2005 | Eryurek et al. ........... 702/183 |
| 7,110,835 | B2* | 9/2006 | Blevins et al. ............. 700/83 |
| 8,069,021 | B2* | 11/2011 | Sturrock et al. ............ 703/6 |
| 2005/0096872 | A1 | 5/2005 | Blevins et al. |
| 2007/0208549 | A1* | 9/2007 | Blevins et al. ............. 703/6 |
| 2008/0052049 | A1* | 2/2008 | Moriyama et al. .......... 703/2 |
| 2009/0089030 | A1 | 4/2009 | Sturrock et al. |

FOREIGN PATENT DOCUMENTS

| CN | 1542575 A | 11/2004 |
| JP | 2007-226430 A | 3/2009 |

OTHER PUBLICATIONS

Fabricius S.M.O. and E. Badreddio, (2002). Modelica Library for Hybrid Simulation of Mass Flow in Process Plants. Proc. 2nd Int. Modelica Conference, Mar. 2002, Munich, Germany.*
Itou, Akio, et al. "EJX910 multivariable transmitter." Yokogawa Technical Report—English Edition—42 (2006).*
Kulikov, Viatcheslav, et al. "Modular dynamic simulation for integrated particulate processes by means of tool integration." Chemical Engineering Science 60.7 (2005): 2069-2083.*

(Continued)

*Primary Examiner* — Aniss Chad
(74) *Attorney, Agent, or Firm* — Marshall, Gerstein & Borun LLP

(57) ABSTRACT

A high fidelity distributed plant simulation technique includes a plurality of separate simulation modules that may be stored and executed separately in different computing devices. The simulation modules communicate directly with one another to perform accurate simulation of a plant, without requiring a centralized coordinator to coordinate the operation of the simulation system. In particular, numerous simulation modules are created, with each simulation module including a model of an associated plant element and being stored in different drops of a computer network to perform distributed simulation of a plant or a portion of a plant. At least some of the simulation modules, when executing, perform mass flow balances taking into account process variables associated with adjacent simulation modules to thereby assure pressure, temperature and flow balancing.

35 Claims, 6 Drawing Sheets

(56) References Cited

OTHER PUBLICATIONS

Abbel-Jabbar et al., "A Multirate Parallel-Modular Algorithm for Dynamic Process Simulation Using Distributed Memory Multicomputers," *Computer and Chemical Engineering*, 23:733-761 (1999).
Garcia-Osorio et al., "Distributed, Asynchronous and Hybrid Simulation of Process Networks Using Recording Controllers," *International Journal of Robust and Nonlinear Control*, 14(2):227-248 (2003).
Liu et al., "Simulation of Large Scale Dynamic Systems I," *Computers and Chemical Engineering*, 11:241-253 (1987).
Mayer, "On the Pressure and Flow-Rate Distributions in Tree-Like and Arterial-Venous Networks," *Bulletin of Mathematical Biology*, 58(4):753-785 (1996).
Paloschi et al., "Parallel Dynamic Simulation of Industrial Chemical Processes on Distributed-Memory Computers," *Computers and Chemical Engineering Supplement*, pp. S395-S398 (1999).
Secchi et al., "The Waveform Relaxation Method in Concurrent Dynamic Process Simulation," *Computer and Chemical Engineering*, 17:683-704 (1993).
Yang et al., "Design and Validation of Distributed Control with Decentralized Intelligence in Process Industries: A Survey," *IEEE International Conference on Industrial Informatics*, pp. 1395-1400 (2008).
Search Report for Application No. GB1019645.9, dated Mar. 17, 2011.
Examination Report from related GB Application No. GB1019645.9 dated Mar. 7, 2014, 4 pages.
Modelica Library for Hybrid Simulation of Mass Flow in Process Plants, 2nd International Modelica Conference, Proceedings, pp. 225-234.
English translation of First Office Action issued in Chinese Patent Application No. 201010584174.9 mailed May 6, 2014. 20 pages.
Examination Report from Related GB Application No. GB1019645.9, dated Sep. 30, 2014, 5 pages.
English Translation of Second Office Action from Chinese Patent Application No. 201010584174.9 dated Jan. 26, 2015.

* cited by examiner

DECENTRALIZED INDUSTRIAL PROCESS SIMULATION SYSTEM

TECHNICAL FIELD

The present invention relates generally to simulating the operation of power generation plants, industrial manufacturing plants, processing plants and other types of plants and, more particularly, to a distributed simulation system that performs improved simulation of plant operation involving material flow.

DESCRIPTION OF THE RELATED ART

Distributed process control systems, like those typically used in power generation, chemical manufacturing, petroleum processing, industrial manufacturing or other types of plants, typically include one or more controllers communicatively coupled to a plurality of field devices via analog, digital, combined analog/digital, or wireless buses. The field devices, which may be, for example, valves, valve positioners, switches, transmitters (e.g., temperature, pressure, level and flow rate sensors), burners, heat exchangers, furnaces, etc. are located within the plant environment and perform process functions such as opening or closing valves, measuring process parameters, etc. in response to control signals developed and sent by the controllers. Smart field devices, such as the field devices conforming to any of the well-known Fieldbus protocols may also perform control calculations, alarming functions, and other functions commonly implemented within or by a plant controller. The plant controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART® and FOUNDATION® Fieldbus field devices. The control modules within the controller send the process control signals over the communication lines or networks to the field devices to thereby control the operation of the process.

Information from the field devices and the controller is usually made available over a data highway to one or more other computer devices, such as operator workstations, personal computers, data historians, report generators, centralized databases, etc., typically placed in control rooms or other locations away from the harsher plant environment. These computer devices may also run applications that may, for example, enable an operator to perform functions with respect to the process, such as changing settings of the process control routine, modifying the operation of the control modules within the controller or the field devices, viewing the current state of the process, viewing alarms generated by field devices and controllers, keeping and updating a configuration database, etc.

As an example, the Ovation® control system, sold by Emerson Process Management, includes multiple applications stored within and executed by different devices located at diverse places within a process plant. A configuration application, which resides in one or more operator workstations, enables users to create or change process control modules and to download these process control modules via a data highway to dedicated distributed controllers. Typically, these control modules are made up of communicatively interconnected function blocks, which are objects in an object oriented programming protocol and which perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine. Each of the dedicated controllers and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces. A data historian application is typically stored in and executed by a data historian device that collects and stores some or all of the data provided across the data highway while a configuration database application may executed in a still further computer attached to the data highway to store the current process control routine configuration and data associated therewith. Alternatively, the configuration database may be located in the same workstation as the configuration application.

In many industries it is desirable to implement a simulation system for simulating the operation of a plant (including the various plant devices and the control network as connected within the plant). Such a simulation system may be used to test the operation of the plant in response to new or different control variables, such as set-points, to test new control routines, to perform optimization, to perform training activities, etc. As a result, many different types of plant simulation systems have been proposed and used in process plants. None-the-less, only the most complex simulation systems are typically able to perform high fidelity simulation of a process plant because of the complex processes being implemented, the ever changing conditions within the plant including the degradation of devices over time and the presence of unaccounted for disturbance variables within the plant.

When simulating commercial industrial process equipment, it is common and well known to use first principle physical laws or equations to implement a simulation models. In this case, a complex set of first principle equations is developed to model the various plant equipment, and a simulator solves all or most of the model equations simultaneously during any particular simulation cycle. The Newton-Raphson method is a well-known example of a simulation technique that implements simultaneous solving of numerous first principle equations to perform simulation. In fact, this type of equation solving mechanism is, in many cases, perceived as a requirement for high-fidelity simulation. However, a major drawback associated with this simulation approach is that the physical models are complex and computationally expensive, especially when the system to be modeled is highly nonlinear and interactive. As a result, these simulation systems must use a centralized nonlinear equation solver to perform the simulation so as to be able to solve all of the coupled nonlinear equations simultaneously. Unfortunately, this technique is usually slow, is computationally inefficient, and is numerically unreliable.

Distributed simulation of large scale, dynamic process systems has been implemented in an attempt to overcome some of the problems associated with centralized simulation techniques. In distributed simulation systems, various simulation tasks are performed throughout a number of different devices (e.g., processors) and these simulation tasks are implemented (executed) separately or independently of one another. Such distributed simulation systems provide a number of advantages over centralized simulation systems, including space decoupling, time decoupling, integrator decoupling and parallel processing. In particular, distributed simulation systems provide space decoupling by breaking down a large simulation problem into a set of smaller sub-problems, thereby allowing one simulation module to be changed, updated or added without affecting the other simulation modules. Distributed simulation systems also provide time decoupling by allowing the use of different integration step sizes for different dynamic modules, which means that these systems can provide better numerical robustness and higher computation efficiency for hard to solve simulation problems without needing to implement an overly aggressive integration step size in each of the simulation modules. Distributed simulation systems provide integrator decoupling as the separate simulation modules can use specific and tailor made integration methods which are different from one another in different modules, thereby enabling different mathematical techniques to be used to solve the different process models. Distributed simulation systems also enable the use of parallel processing, as the different simulation modules can be implemented simultaneously on a distributed network of computers. This feature also allows for easy trouble shooting, as problems can usually be identified locally with respect to a particular simulation module.

A number of investigations have been performed with respect to distributed simulation of process and power systems. For example, Brosilow C, Yin-Chang, "Simulation of Large Scale Dynamic Systems I," Computers and Chemical Engineering, 11:241-253, 1987, developed algorithms which used direct substitution, extrapolation, and Newton type iteration to perform a simulation. However, a coordinator was needed to keep the simulation synchronized as this coordinator was needed to set a time horizon for each dynamic module and to compute interconnections between the sub-systems. While the coordinator allowed each module to have a different integration algorithm and step size, the coordinator was still needed to manage the simulation sub-systems. On the other hand, Secchi A R, Morari M, Biscala Jr E C, "The Waveform Relaxation Method in Concurrent Dynamic Process Simulation," Computer and Chemical Engineering, 17:683-704, 1993, investigated the concurrent solution of low-index differential equations (DAEs) using the wave relaxation (WR) method, which is highly parallelizable. The concurrent solution of DAEs on parallel machines using the WR method was implemented. Here, Jacobi iterations were used, meaning that at the beginning of each iteration, every model was provided with an updated vector of interconnection functions. However, again in this case, a central coordinator was required to guarantee global convergence.

Paloschi J, Zitney S E, "Parallel Dynamic Simulation of Industrial Chemical Processes on Distributed-Memory Computers." AICHE Annual Meeting, Los Angeles, Calif., 1997, described a parallel-modular solution approach to solve plantwide or multiple plant problems on distributed-memory computers. This approach partitioned a large super-plant master into a number of smaller, interconnected sub-plant slaves that were executed in parallel. Initial values were provided for all the interconnecting tear variables while sub-plant simulations produced new tear values in parallel. The overall simulation connectivity was supplied in the super-plant flowsheet, where each unit represented a sub-plant. For steady-state simulation, the master converged the simulation using successive substitution or a Newton method. For dynamic simulation, the master synchronized the sub-plant integrations. The sub-plants were integrated in parallel over a common time horizon by a suitable integration method and step-length sequence.

Abbel-Jabbar N, Carnahan B, Kravaris C, "A Multirate Parallel-Modular Algorithm for Dynamic Process Simulation Using Distributed Memory Multicomputers." Computer and Chemical Engineering, 23:733-761, 1999, described a coordination algorithm for parallel implementation of modular integration that can be implemented efficiently on large, message-passing, concurrent computers (multicomputers). The algorithm is based on a dynamic, block Jacobi-like iteration, and cubic spline interpolation for approximating the interconnection input variables at different time points. With this approach the interprocessor communications during integration are eliminated. However, the module integrations must be iterated over each time horizon until all module integrations converge to satisfy a global error criterion for the iterative solution. The algorithm is therefore implemented using a master-slave paradigm.

Importantly, each of these distributed simulation techniques uses a master-slave (client-server) structure. Thus, these approaches require a central coordinator (server) that knows the overall flow diagram or flow sheets and that coordinates the flow of interconnection variables between different modules while the integration of each sub-system executes in a client computer. As a result, these algorithms may not efficiently deal with the case in which the number of sub-systems is large because in such a situation, there is a heavy computational load on the server side. In particular, the central coordinator must calculate and break the mass and energy balances at the transient stages, which places a high computational load on the central server, especially in a large system. Of course, if the server has too heavy of a computational load, the simulation system slows down and may not be able to be run in real time. Another potential problem is that the available communication bandwidth may be insufficient. In particular, at the synchronization point (i.e., at the central server), the communication load of the network may be huge, requiring a high hardware implementation cost.

Some strategies that do not require a central coordinator (server) are also known. In particular, Mayer S, "On the Pressure and Flow-Rate Distributions in Tree-Like and Arterial-Venous Networks," Bulletin of Mathematical Biology, 58(4):753-785, 1996, discloses an efficient algorithm that computes the pressure and flow-rate distributions for steady flow in an arbitrary, tree-like network. Given the tree topology, the conductance of each segment and the pressure distribution at the boundary nodes, the solution is obtained using a simple recursion technique based on perfect Gauss elimination. An iterative method using this algorithm is suggested as being able to solve for the pressure and flow-rate distributions in an arbitrary diverging-converging network consisting of two tree-like networks that are connected to each other. A number of special solutions for tree-like networks are obtained for which the general algorithm is either simplified or can be replaced by closed form solutions of the pressure and flow-rate distribution. However, while this approach may be useful for biological applications, it is not very useful in a typical industrial application because the pressure-flow relationship is modeled by a simple linear relationship. In addition, this approach is accurate only for steady-state applications, because it does not account for flow mismatch during dynamic transients.

Garcia-Osorio V, Ydstie B E, "Distributed, Asynchronous and Hybrid Simulation of Process Networks Using Recording Controllers," International Journal of Robust and Nonlinear Control, 14(2):227-248, December 2003, describes a distributed simulation network of physically distinct processing units. Each of the processing units solves using its own integration routines and the information sent between the different sub-systems is synchronized at some fixed or variable communication interval. The states are then reconciled and the simulation proceeds to the next step. All of the sub-units are synchronized at the end of the simulation step by a recording controller, which records and controls mass balance at the interconnections between the sub-systems. However, because the recording mechanism is essentially an integral control action, extra dynamics are introduced by this method, which effectively prolongs the time horizon of process dynamic response and propagation of the response, making this approach impractical for processes involving fast-action electro-mechanical devices (e.g., pumps, fans, valves, etc.). Moreover, the recording controller approach uses simple averaging of two boundary pressures, which makes it impossible to detect actions such as complete shut-off of a valve. Moreover, the number of tuning parameters grows proportionally as the network size grows. Therefore, if the system is not properly tuned, the newly introduced recording controllers may cause system instability.

SUMMARY

A high fidelity distributed plant simulation technique performs real-time simulation or prediction of a process or plant network in a manner that uses a distributed set of simulation modules without requiring a centralized coordinator to coordinate the operation of the system, and in a manner that accurately solves mass and flow balances at the distributed sites in both steady state and dynamic conditions. In particular, the simulation system described herein includes any number of separate simulation modules, each of which implements first principle models or other types of models to model the operation of a plant component. More particularly, the simulation system includes plant element simulation modules that model various plant components, such as tanks, heat exchangers, etc. and may include pipe simulation modules that model connection elements within the process or plant, such as pipes, etc., which operate to transport material flow from one plant element to another plant element.

Importantly, each of the simulation modules implements mass flow, pressure and/or temperature balancing equations which take into account the pressures, flow rates, and/or temperatures, etc. of upstream or downstream simulation modules, to thereby balance mass flows without the need of a central coordinator. In particular, each simulation module communicates with both upstream and downstream simulation modules and implements model equations that assure that mass flow is conserved across or between the upstream and downstream components. These simulation modules thereby eliminate the need for a central coordinator that tracks flow or that implements mass balancing equations for all of the distributed simulation modules. Still further, in the process of implementing mass flow balancing equations, the simulation modules provide feedback from downstream process element simulation modules to upstream process element simulation modules, so that changes in the downstream elements, such as changes in settings of flow shut-off valves, can be recognized and modeled in upstream elements, without the use of global variables within the simulation system and, again, without the use of a central coordinator.

Still further, the simulation system implements a procedure that recognizes temporary mass imbalances in simulation modules, caused by, for example, transient or dynamic conditions, and deals with these transient mass imbalances in a manner that conserves mass over time and across multiple simulation modules, on as to provide an accurate simulation of the plant in the presence of dynamic changes, again without the need of a central coordinator. In particular, each simulation module associated with a non-mass storage device (e.g., a pipe) recognizes a disparity of mass flow between its input and its output as a result of a dynamic or a transient flow situation (i.e., a situation in which mass flow is increasing or decreasing), and communicates the amount of this mass imbalance to an upstream or a downstream simulation module. Over numerous cycles of the simulation system, mass imbalances detected by simulation modules associated with non-mass storage devices are thereby transferred to and are accumulated in simulation modules associated with mass storage devices (e.g., tanks), where the mass actually accumulates or depreciates. The simulation modules associated with the mass storage devices can accept and balance these transient masses over long term operation of the simulation system. This feature assures that mass is neither gained nor lost as a result of the modeling of mass flow through non-mass storage devices during dynamic changes in mass flow through these elements.

Additionally, the simulation system described herein uses simulation modules having a memory structure that stores and enables communication of information between upstream and downstream simulation modules, without the need to perform global communication calls between simulation modules and without the need for a central coordinator that knows or tracks the flow paths within the system. The memory and communication procedure used by the distributed simulation modules enables direct and immediate communication between directly connected simulation modules (i.e., any set of immediately connected upstream and downstream simulation modules) which, in turn, simplifies communications within the simulation system while still assuring that the upstream and downstream information that is needed to perform modeling within any particular simulation module is immediately available when the simulation module executes.

DETAILED DESCRIPTION

Figure 1:
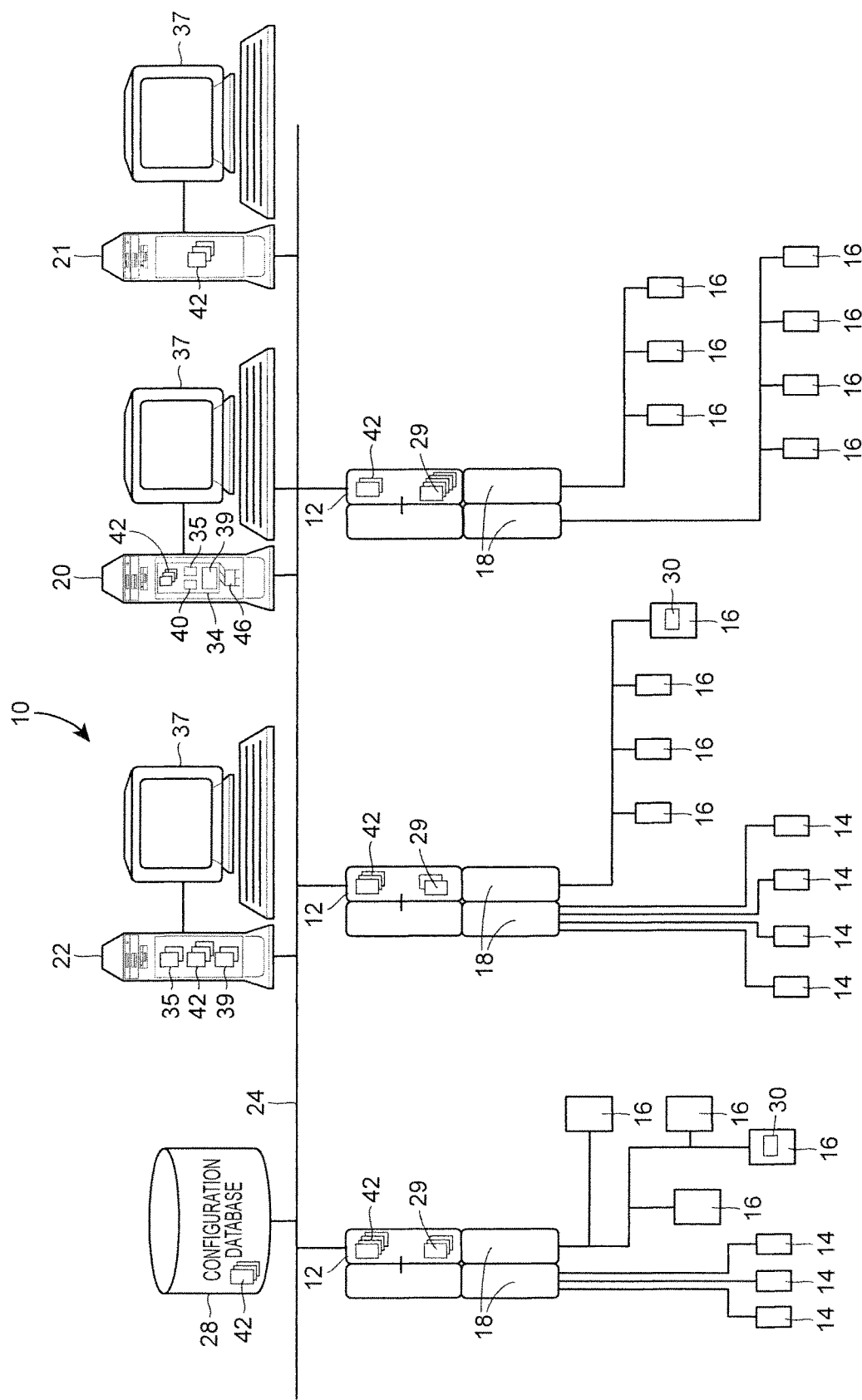
FIG. 1 is a block diagram of a distributed plant and process control network located within a plant such as a power plant, including one or more operator workstations, controllers, or virtual controllers that implement a simulation system including a set of distributed simulation modules configured to accurately simulate the operation of the plant.

Referring now to FIG. 1, an example distributed control network for a plant 10, such as that associated with a power generation plant, an industrial manufacturing plant, a processing plant, etc. is illustrated at an abstract level of detail. The plant 10 includes a distributed control system having one or more controllers 12, each of which is connected to one or more field devices 14 and 16 via input/output (I/O) devices or cards 18 which may be, for example, Fieldbus interfaces, Profibus® interfaces, HART® interfaces, standard 4-20 ma interfaces, etc. The controllers 12 are also coupled to one or more host or operator workstations 20, 21 and 22 via a data highway 24 which may be, for example, an Ethernet link. A database 28 may be connected to the data highway 24 and operates as a data historian to collect and store process parameter, status and other data associated with the controllers 12 and field devices 14, 16 within the plant 10. Additionally, or alternatively, the database 28 may operate as a configuration database that stores the current configuration of the process control system within the plant 10 as downloaded to and stored within the controllers 12 and field devices 14 and 16. While the controllers 12, the I/O cards 18 and the field devices 14 and 16 are typically located down within and are distributed throughout the sometimes harsh plant environment, the operator workstations 20, 21 and 22 and the database 28 are usually located in control rooms or other less harsh environments easily assessable by controller or maintenance personnel.

As is known, each of the controllers 12, which may be by way of example, the Ovation® controller sold by Emerson Process Management Power and Water Solutions, Inc., stores and executes a controller application that implements a control strategy using any number of different, independently executed, control modules or blocks 29. Each of the control modules 29 can be made up of what are commonly referred to as function blocks wherein each function block is apart or a subroutine of an overall control routine and operates in conjunction with other function blocks (via communications called links) to implement process control loops within the process plant 10. As is well known, function blocks, which may but need not be objects in an object oriented programming protocol, typically perform one of an input function, such as that associated with a transmitter, a sensor or other process parameter measurement device, a control function, such as that associated with a control routine that performs proportional-integral-derivative (PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc.

In the plant 10 illustrated in FIG. 1, the field devices 14 and 16 connected to the controllers 12 may be standard 4-20 ma devices, may be smart field devices, such as HART®, Profibus®, or FOUNDATION® Fieldbus field devices, which include a processor and a memory, or may be any other desired type of field devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement one or more process control loops, as is well known. Of course, the field devices 14 and 16 may be any types of devices, such as sensors, valves, transmitters, positioners, etc. and the I/O devices 18 may be any types of I/O devices conforming to any desired communication or controller protocol such as HART®, Fieldbus, Profibus®, etc.

Still further, in a known manner, one or more of the workstations 20-22 may include user interface applications to enable a user, such as an operator, a configuration engineer, a maintenance person, etc. to interface with the process control network within the plant 10. In particular, the workstation 22 is illustrated as including a memory 34 which stores one or more user interface applications 35 which may be executed on a processor 46 within the workstation 22 to communicate with the database 28, the control modules 29 or other routines within the controllers 12 or I/O devices 18, with the field devices 14 and 16 and the modules 30 within these field devices, etc. to obtain information from the plant, such as information related to the ongoing state of the plant equipment or the control system. The user interface applications 35 may process and/or display this collected information on a display device 37 associated with one or more of the workstations 20-22. The collected, processed and/or displayed information may be, for example, process state information, alarms and alerts generated within plant, maintenance data, etc. Likewise, one or more applications 39 may be stored in and executed in the workstations 20-22 to perform configuration activities such as creating or configuring the modules 29 and 30 to be executed within the plant, to perform control operator activities, such as changing set-points or other control variables, within the plant, etc. Of course the number and type of routines 35 and 39 is not limited by the description provided herein and other numbers and types of process control related routines may be stored in and implemented within the workstations 20-22 if desired.

The workstations 20-21, the database 28 and some of the controllers 12 of FIG. 1 are also illustrated as including components of a distributed simulation system that may be implemented in a distributed computer network, such as that of FIG. 1. In particular, the workstation 20 is illustrated as including a set of simulation support applications 40, which may include a simulation configuration application, a user interface application and data structures for performing simulation of the process plant 10 in a manner described herein. Generally speaking, the simulation applications 40 enable a user to create, implement and view the results of a distributed simulation system within the computer network system of FIG. 1. More particularly, the distributed simulation system includes various distributed simulation modules 42 that may be located in various different computing devices (also referred to as drops) on the computer network of FIG. 1. Each of the simulation modules 42 stores a model that is implemented to simulate the operation of an individual plant component or group of components, and the simulation modules 42 communicate directly with one another to implement a simulation of a larger portion of the plant 10. Any particular simulation module 42 may be used to simulate any portion or part of the plant 10, including a particular piece of plant equipment involved in processing or material flow, such as a tank, a heat exchanger, a controller, etc., or a group of equipment, such as a unit. Still further, the simulation modules 42 may be located in and executed in various different devices or drops on the computer network and may communicate via, for example, the communication bus 24 to send data between the simulation modules 42 so as to perform simulation of a larger group or set of plant equipment. Of course, any desired number of simulation modules 42 may be located in any particular drop and each drop will execute the simulation modules 42 therein independently of the other drops, so as to implement distributed simulation. However, if desired, all of the simulation modules 42 associated with any particular simulation may be stored in an executed by the same computer device (i.e., at a single drop) and still be implemented in the manner described herein.

The simulation applications 40 may be accessed by any authorized user (such as a configuration engineer, an operator or some other type of user) and may be used to create and configure a particular instance of a distributed simulation system, by creating a set of simulation modules 42 and downloading these modules 42 to different drops within the plant or computer network. As illustrated in FIG. 1, various ones of the distributed simulation modules 42 may be downloaded to and implemented in the workstations 20-22, the controllers 12, the database 28 and/or any other computer device or processing device connected to the communication network 24. If desired, simulation modules 42 may be located and implemented in other processing devices that are indirectly connected to the network 24, such as in the field devices 16, in a business local area network (LAN) or even a wide area network (WAN) connected to one of the devices on the network 24. Still further, while the bus 24 is illustrated in FIG. 1 as the main communication network used to connect various drops that implement simulation modules, other types of communication networks could be used to connect drops, including any desired LANs, WANs, the internet, wireless networks, etc.

Once downloaded, the simulation modules 42 execute individually but operate in conjunction with one another to perform simulation of the plant or components and equipment within the plant, as being controlled by the control blocks 29 and 30 as well as other controller routines executed within the controllers 12 and possibly the field devices 14, 16. Such a distributed simulation system may enable a user to perform different simulation and prediction activities with respect to the plant 10, via a user interface application in the suite of simulation applications 40. If desired, a distributed simulation system may simulate an operating plant or any portion thereof, such as that illustrated in FIG. 1, or may simulate a plant that has not actually been constructed.

While prior art distributed simulation systems have included simulation components executed in separate computing devices with the simulation components using first principle algorithms, these prior art simulation systems had difficulty in providing coordination between the separate simulation components because of the need to balance mass flows and to equalize or match pressures, temperatures, etc. between the separate components. This was especially problematic in prior art simulation systems in which downstream components affected the mass flow rates and pressures of upstream components. For example, the shutting or closing of a valve downstream of a set of plant components affects the upstream mass flows and pressures, and a simulation system must account for these changes. In the past, distributed simulation systems (such as process control simulation systems) typically did not enable downstream changes to be recognized in the modeling of upstream components, at least at the distributed module, because module calculations were performed at the upstream components first, and the results thereof were propagated to the downstream components for use in the modeling of the downstream components. Because information flow was always from an upstream component to a downstream component, changes made to the settings of the downstream components could not be accounted for in the upstream components models. To solve this problem when simulating mass flow, a central coordinator was typically used to manage downstream changes and to account for these changes, as well as to perform mass flow and pressure balancing between the various distributed simulation elements.

The distributed simulation system described herein, on the other hand, implements a distributed simulation technique that solves the process models individually such that all major equipment/component models can be based on first-principle equations, if desired, while accounting for downstream changes and while solving for mass and momentum balances at the distributed simulation modules themselves. Moreover, in this distributed simulation system, the model equations may be solved sequentially without requiring strict execution order and without requiring the use of a central coordinator, which effectively simplifies the solving and trouble-shooting process while also allowing more flexibility for future modification and expansion because the system architecture is distributed in nature.

As noted above, one of the difficulties that arises from a distributed simulation approach is the need to synchronize interacting information among different equipment component simulation modules. In particular, because the model equations are solved separately based on individual component characteristics, there is no guarantee that the computational result of one model calculation will match the conditions resulting from the computations performed in another module. A simple example of this problem can be illustrated in the case of the modeling of two cascade steam/flue-gas heat exchangers (typically used in an industrial boiler system), in which the steam flow outlet of the first heat exchanger is connected to the inlet of the second heat exchanger through a pipe (or piping system). In any state of the system, the inlet/outlet connections of the two heat exchangers must have matching steam flow rates (neglecting piping dynamics), because there is no other way for steam enter or exit the system. However, if the first-principle model equations are solved for each heat exchanger individually, the resulting mass flow rates for the two heat exchangers may not be consistent.

Another difficulty in implementing this sequential solving mechanism relates to the directionality of the component execution order. In a typical drag-and-drop type of graphically built control scheme, each individual component is solved sequentially in one direction. One component sends its calculation output to the inputs of the next connected component. However, the upstream component does not take into consideration the calculation result (even any intermediate result) from the downstream component. In other words, if there is no explicit feedback from downstream component to the upstream component, any process change in the downstream component will not be reflected in the upstream component unless a large amount of global variables are defined. However, it is typically undesirable to use global variables in a process control system or a plant control system, especially in a distributed control system, because such global variables constrain and may cause problems with the operation of the distributed components, which are typically constructed to be able to assign and use any local variables without worrying about interfering with other components in the system.

In order to make this approach as close as possible to high-fidelity in a graphically built commercial simulation environment, three strategies are implemented and enforced in the distributed simulation system described herein. First, a piping mechanism is enforced to reconcile flow rates in all connecting paths. Second, all values utilized by the system at runtime are housed in a data structure termed a record, which is a collection of related values. The system identifies all records using a unique numerical identifier termed a system ID. Every simulation algorithm block is assigned a record that houses all configuration information about the model for that simulation block. Moreover, once the system ID of a model algorithm is known, not only is the configuration information stored in its record accessible, all dynamic information computed during runtime by the simulation module or its associated modeling algorithm is also available. These algorithm record system IDs can be utilized to facilitate a type of inter-process communication between algorithms or simulation blocks. In one case, the system ID of a simulation algorithm may be assigned a signal pin in the graphical control builder environment, which allows the user to connect the signals together to define information paths. Using this methodology, the user can define a flow stream (e.g., flow of water, steam, or any other kind of medium) between two simulation modules or algorithm blocks by simply connecting the algorithm record signals together.

Third, in a discrete-time computer implementation, a fast sampling rate is used to minimize component to component propagation delay, especially when the propagation direction is not the same as the sequential execution order. Taking advantage of the distributed nature of a distributed control system platform is almost guaranteed to satisfy this requirement. In theory, any desired model enhancement, expansion or addition to the simulation system may be accommodated by adding another processing unit to the networked system.

While the distributed simulation system described herein can be used in any desired type of plant to simulate material flow through the plant (liquids, gases or even solids), one example distributed simulation system is described herein as being used to simulate a power generation plant being controlled using distributed control techniques. However, the distributed simulation technique described herein can be used in other types of plants and control systems, including industrial manufacturing and processing plants, water and waste water treatment plants, etc. and can be used with control systems implemented centrally or as distributed control systems.

Figure 2:
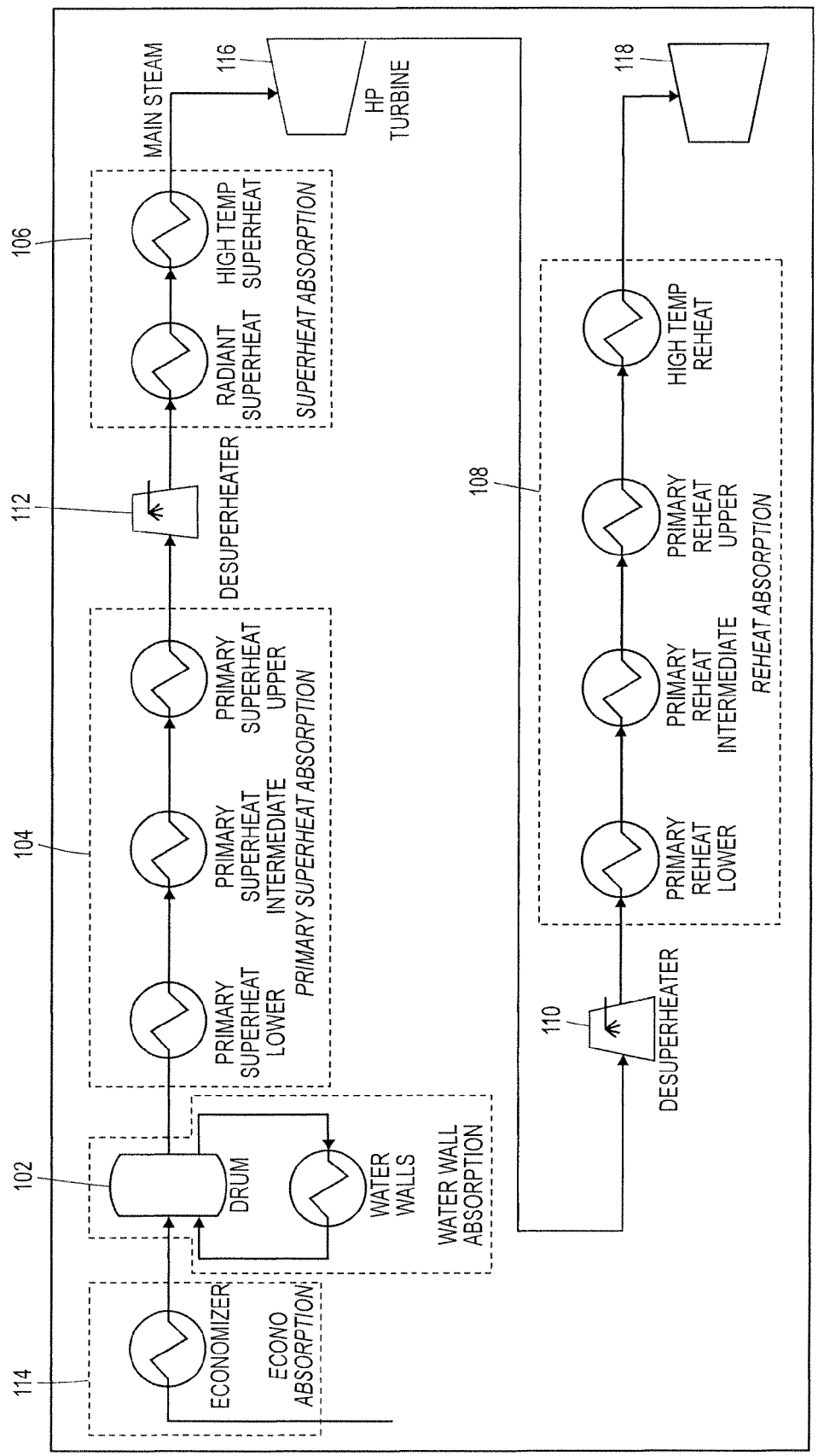
FIG. 2 is a block diagram of various components of a boiler steam cycle of a typical boiler based power plant that may be simulated using the distributed simulation system of FIG. 1.

FIG. 2 illustrates a block diagram of a boiler steam cycle for a typical boiler 100 that may be used, for example, by a thermal power generation plant. The boiler 100 includes various sections through which steam or water flows in various forms such as superheated steam, reheat steam, etc. While the boiler 100 illustrated in FIG. 2 has various boiler sections situated horizontally, in an actual implementation, one or more of these sections may be positioned vertically, especially because flue gases heating the steam in various boiler sections, such as a water wall absorption section, rise vertically.

In any event, the boiler 100 illustrated in FIG. 2 includes a water wall absorption section 102, a primary superheat absorption section 104, a superheat absorption section 106 and a reheat section 108. Additionally, the boiler 100 includes one or more de-superheaters 110 and 112 and an economizer section 114. The main steam generated by the boiler 100 is used to drive a high pressure (HP) turbine 116 and the hot reheat steam coming from the reheat section 108 is used to drive an intermediate pressure (IP) turbine 118. Typically, the boiler 100 may also be used to drive a low pressure (LP) turbine, which is not shown in FIG. 2.

The water wall absorption section 102, which is primarily responsible for generating steam, includes a number of pipes through which steam enters a drum. The feed water coming into the water wall absorption section 102 may be pumped through the economizer section 114. The feed water absorbs a large amount of heat when in the water wall absorption section 102. The water wall absorption section 102 has a steam drum, which contains both water and steam, and the water level in the drum has to be carefully controlled. The steam collected at the top of the steam drum is fed to the primary superheat absorption section 104, and then to the superheat absorption section 106, which together raise the steam temperature to very high levels. The main steam output from the superheat absorption section 106 drives the high pressure turbine 116 to generate electricity.

Once the main steam drives the HP turbine 116, the exhaust steam is routed to the reheat absorption section 108, and the hot reheat steam output from the reheat absorption section 108 is used to drive the IP turbine 118. The de-superheaters 110 and 112 may be used to control the final steam temperature to be at desired set-points. Finally, the steam from the IP turbine 118 may be fed through an LP turbine (not shown here) to a steam condenser (not shown here), where the steam is condensed to a liquid form, and the cycle begins again with various boiler feed pumps pumping the feed water for the next cycle. The economizer section 114 is located in the flow of hot exhaust gases exiting from the boiler and uses the hot gases to transfer additional heat to the feed water before the feed water enters the water wall absorption section 102.

Figure 3:
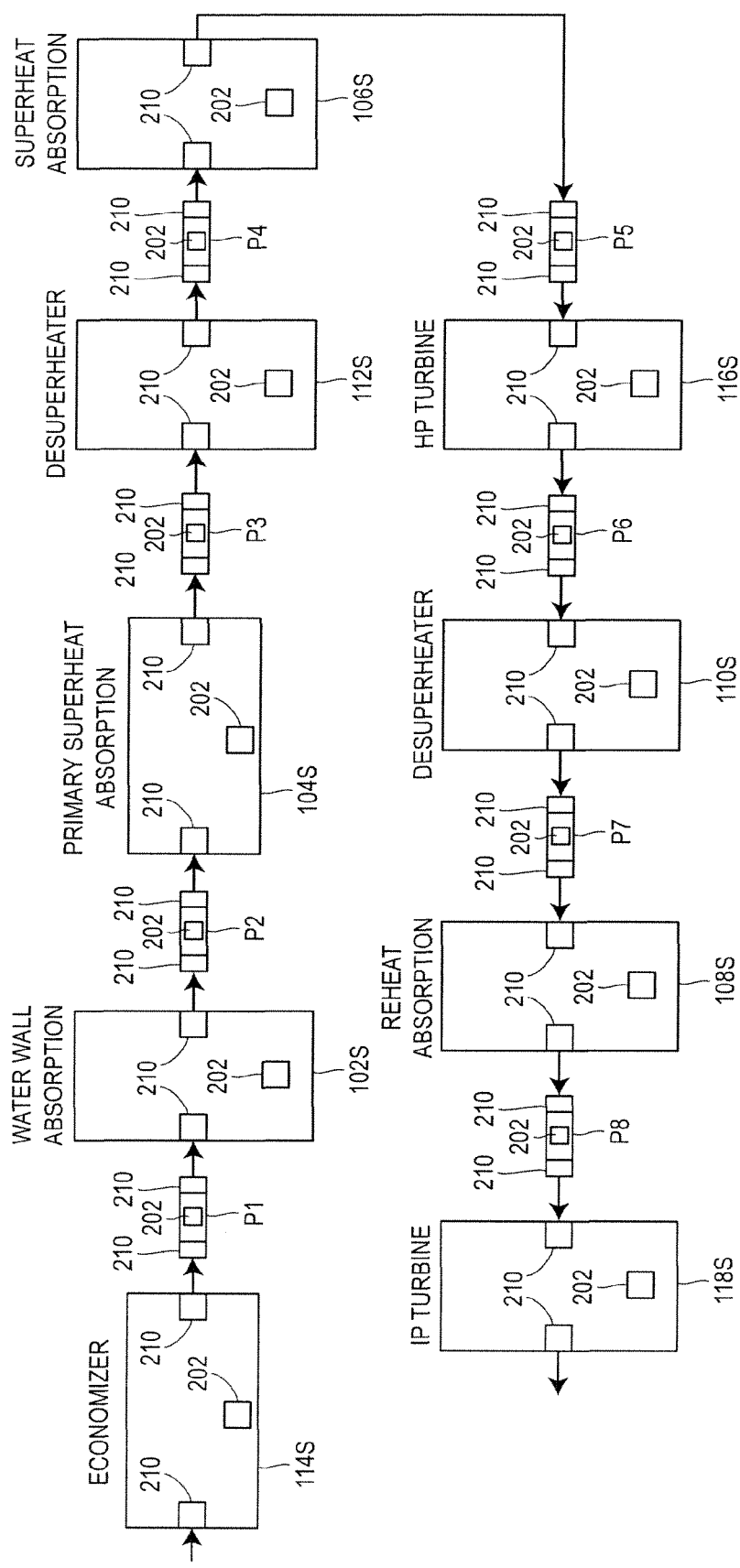
FIG. 3 is a block diagram of a set of distributed simulation modules of a distributed simulation system configured to simulate the operation of the boiler steam cycle of the power plant of FIG. 3.

FIG. 3 illustrates a set of simulation modules 42 that may be used or implemented in a distributed manner to simulate the operation of the boiler steam cycle of FIG. 2. As can be seen in FIG. 3, the distributed simulation modules 42 include separate simulation modules for each of the main plant elements depicted in FIG. 2 including a water wall absorption simulation module 102S, a primary superheat absorption simulation module 104S, a superheat absorption simulation module 106S, a reheat absorption simulation module 108S, desuperheater simulation modules 110S and 112S, an economizer simulation module 114S, and turbine simulation modules 116S and 118S. Of course, these simulation modules include plant element models, which may be in the form of first-principle equations, or any other desired types of models, which model the operation of these elements to produce simulated outputs for the corresponding plant equipment of FIG. 2 based on the inputs provided thereto. While a separate simulation module is illustrated in FIG. 3 for each of the major plant components of FIG. 2, simulation modules could be made for sub-components of these the components of FIG. 2 or a single simulation module could be created combining multiple ones of the plant components of FIG. 2.

However, as illustrated in FIG. 3, the distributed simulation system also includes pipe simulation modules P1-P8 which are disposed between the plant element simulations modules described above. The general operation of the pipe simulation modules P1-P8 will be described in more detail below, but are primarily responsible for modeling flow between plant element simulation modules, providing feedback from downstream simulation modules to upstream simulation modules and implementing mass flow and momentum balancing equations to equalize the simulations performed by the different plant element simulation modules. Thus, generally speaking, the distributed simulation technique and system described herein uses a number of separate simulation modules, wherein each simulation module models or represents a different active component in the process or plant being simulated (referred to herein as plant element simulation modules) or models or represents a connection element within the plant, (referred to herein as pipe simulation modules). During operation, each simulation module may be executed separately, either in a common machine or processor or in separate machines or processors, to thereby enable parallel and distributed processing. Thus, for example, the different simulation modules of FIG. 3 can be executed in different and various ones of the workstations 20-22 of FIG. 1, the controllers 12 of FIG. 1, the field devices 16 of FIG. 1, the database 28 of FIG. 1, etc.

As indicated above, and as illustrated in FIG. 3, each of the simulation modules of FIG. 3 includes one or more executable models 202 for modeling the operation of an associated plant element or pipe and the simulation modules operate to implement these model(s) 202 to simulate operation of a plant element based on the inputs delivered to the plant element (in the form of fluids, solids, control signals, etc.) In most cases, the simulation modules will perform simulation based on an indication of an input (e.g., a fluid input, a gas input, etc.) from an upstream simulation module and will produce one or more output indications, indicating an output of the process or plant element (e.g., in the form of a fluid or gas output, etc.) The models 202 used in the plant element simulation modules may be first principle models or any other suitable type of models for the particular piece of equipment being simulated. The pipe simulation modules P1-P8 of FIG. 3 also include models 202 or a set of equations which implement mass flow and momentum balancing routines to balance the mass flow, pressures, etc. between the different process simulation elements.

Importantly, one or more of the models 202 of FIG. 3 is designed and configured to model operation of a plant element using one or more process variables (e.g., pressure, temperature, flow rate, etc.) associated with an upstream and/or a downstream simulation module and operate to balance pressures, flow rates, temperatures, etc. between the simulation modules so as to assure conservation of mass, etc. across the multiple simulation modules. Moreover, a model for a particular simulation module uses downstream information (i.e., pressures, flow rates, temperatures, etc. from downstream simulation modules) in performing simulation of its associated plant element, information flows from downstream elements to upstream elements automatically, and this information is then taken into account during the successive simulation cycles leading to a more accurate overall simulation.

Thus, as indicated above, there are two basic types of simulation modules, including process element simulation modules and pipe simulation modules. As used herein process element simulation modules simulate plant elements that perform mass flow addition or reduction or that perform mechanical energy addition or reduction other than at the inlet and the outlet thereof, although other plant elements may be modeled by process element simulation modules. Examples of process simulation elements include heat exchangers, boilers, superheaters, tanks, etc. The concept of a pipe simulation module, as used herein, includes all types of connecting devices that do not have mass flow addition or reduction or any mechanical or thermal energy addition or reduction other than at the inlet and outlet thereof. Pipe simulation modules may include, but are not limited to, simulations of actual pipes (long or short), valves, junctions/splitters, etc. Basically, pipe simulation modules are used to introduce an opportunity in the simulation technique to implement mass flow balancing operations between the distributed simulation modules. In the process of implementing these balancing equations, the pipe simulation modules also provide feedback from downstream simulation modules to upstream simulation modules to enable events or variables that are changed in downstream components to be reflected in and affect upstream simulation modules in a relatively quick manner, without the use or need of a central coordinator.

In order to operate properly without the need of a centralized coordinator, each of the simulation modules of FIG. 3 receives information directly from its immediately connected upstream and downstream simulation modules, with this information being indicative of certain process and control variable information associated with or calculated in these upstream and downstream simulation modules. To implement this communication structure, each of the simulation modules of FIG. 3 includes one or more memory storage locations 210 that are uniquely associated or tied to the simulation module and which store information from an upstream and/or a downstream simulation module to be used by the simulation module during its modeling procedure. The details of this memory and communication structure will be described in more detail below.

In any event, each of the simulation modules of FIG. 3, including the pipe simulation modules P1-P8 may perform mass flow balancing between the inputs and output of two or more associated simulation modules, in a manner that enables small computational inaccuracies to be corrected for or accounted for in the entire simulation, and in a manner that enables changes in a downstream plant element simulation module to be used or reflected in an upstream plant element simulation module. In general, each simulation model 202 uses process variables, such as pressure, temperature, flow rate, etc. of both the immediate upstream simulation component(s) and the immediate downstream simulation component(s), to balance the mass flow and other variables between the outputs of these upstream and downstream components to thereby assure a simulation result which is balanced (e.g., conserves mass flow) across multiple simulation components.

Figure 4:
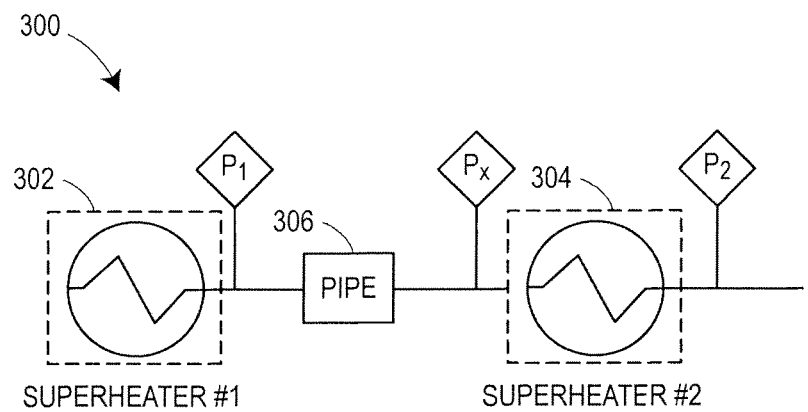
FIG. 4 illustrates a pipe simulation module communicatively connected between two plant element simulation modules in the form of heat exchanger simulation modules to perform mass flow balancing between the two plant element simulation modules.

A section of the simplified simulation system 300 illustrated in FIG. 4 will be used to illustrate the operation of a pipe simulation module in conjunction with an upstream and a downstream plant element simulation module to illustrate one manner in which a pipe simulation module can implement mass flow balancing using upstream and downstream simulation variables. As will be seen, the example simulation system 300 of FIG. 4 includes two superheater plant element simulation modules 302 and 304 interconnected by a pipe simulation module 306. The outlet of the first (upstream) superheater simulation module 302 and the inlet of the second (downstream) simulation module 304 are connected in the flow path to the input and the output of the pipe module 306, respectively, using a flow path pin. This configuration allows various flow stream values to be passed between the algorithms of the simulation modules 302-306 as a vector of information and also allows the pipe simulation algorithm to have access to the calculated output pressure of the downstream connected model algorithm of the simulation module 304.

Generally speaking, the algorithms associated with the plant element simulation modules 302 and 304 calculate an outlet variable, such as pressure, in a manner that uses downstream variable values, to thereby provide for a more accurate simulation as process variables such as pressure, temperature, and flow rate are reconciled across multiple simulation modules using this technique. For example, the pipe modeling algorithm within the pipe simulation module 306 is constructed to reconcile flow rates between the different components (in this case between the superheaters 302 and 304), and the output pressure $P_x$ of the pipe simulation module 306 serves as the key reconciliation factor.

During operation, the models run in the superheater simulation modules 302 and 304 calculate the outlet pressures denoted $P_1$ and $P_2$ for the superheater 302 and the superheater 304, respectively. The input pressure for superheater 304 is denoted as $P_x$.

In this example, the algorithms of each simulation module 302 and 304 publishes its calculated output pressure as part of the algorithm shared memory in a manner described in more detail below. As a result, the outlet pressure of any particular component is accessible to the algorithm that is connected directly ahead (upstream) of it in the flow path. In the simulation arrangement of FIG. 4, the superheater model for the simulation module 304 calculates the output pressure $P_2$, while the superheater model for the simulation module 302 calculates the output pressure $P_1$. If the pipe element 306 is assumed to be lossless, the pressures $P_1$ and $P_x$ should be identical. In the case of a non-lossless pipe, the two pressures $P_1$ and $P_x$ will not be equal, but will differ by the pressure difference between the two ends of the pipe element (or the pressure loss across the pipe element).

However, because each equipment model (or each model of a section of equipment) is computed individually, there is no guarantee that the outlet flow of a particular piece of equipment will be equal to the inlet flow of the next downstream equipment at each sampling time. Therefore, a reconciliation mechanism has to be in place to ensure that these mass flow rates match. This mechanism is implemented through the calculation of the outlet pressure $P_x$ within the connecting pipe simulation module 306. The calculations which may be performed by the pipe simulation module 306 to reconcile the pressures and mass flow between the simulations modules 302 and 304 of FIG. 4 will be discussed below.

In this case, equation (1) sets the mass flow into the pipe element 306 and the mass flow out of the pipe element 306 equal to one another, which much be the case in steady state situations with a lossless pipe.

$$\dot{m}_{in} = \dot{m}_{out} \tag{1}$$

For each pipe element in the simulation, the relationship in equation (1) is assumed to be valid at steady-state. That is, the mass flows in and mass flows out of the pipe are equal. However, the mass flow through the pipe element 306 can be expressed as a function of the square root of the pressure difference between two points in the flow path. This quadratic relationship between pressure and flow is an important consideration, as it more accurately models the physical operation of the plant. This relationship is shown for the first superheater 302 of FIG. 4 in equation (2) below.

$$\dot{m}_1 = K_{pipe} \cdot \sqrt{(P_1 - P_x)} \tag{2}$$

Likewise, the mass flow through the second superheater 304 of FIG. 4 is given by equation (3).

$$\dot{m}_2 = K_{sh2} \cdot \sqrt{(P_x - P_2)} \tag{3}$$

In both equations (2) and (3), each of the K values represents the conductance of the corresponding component and is a function of the physical properties of the associated component. These K values can be calculated from the physical data for the component, can be determined by empirical test data or in any other desired manner, and these values may be included in the configuration parameters for the pipe modeling algorithm used in the pipe simulation module 306. Now, the pressure $P_x$ can be calculated by substituting equations (2) and (3) into equation (1) resulting in:

$$P_x = \frac{p_1 \cdot (K_p)^2 + p_2 \cdot (K_{sh2})^2}{(K_p)^2 + (K_{sh2})^2} \tag{4}$$

Here, the pressure $P_x$ is a weighted average of the pressures $P_1$ and $P_2$. Once the pressure $P_x$ is obtained, the corresponding flow rates at both ends of the pipe element 306 can be calculated using equations (2) and (3), a process referred to as flow reconciliation. It is important to note that this calculation does not assume flow directions are known a priori. Instead, the flow directions are totally dependent on the difference between values of the pressures $P_1$ and $P_2$. Still further, as will be understood, the operation of the pipe element 306, in calculating the inlet pressure $P_x$ of the second superheater simulation element 304, as well as the mass flow rates into and out of the second superheater simulation element 304 balances the mass flow and pressure equations between the simulation elements 302 and 304, thereby assuring an accurate simulation of the entire system, despite various of the models being executed in separate computing devices.

If desired, dynamics can be attached to the pressure and mass flow calculations performed by the pipe simulation element 306 using, for example, low pass filters. In this case, the dynamics of the pipe outlet pressure and flow can be attached by passing the computed pressure $P_x$ through a low-pass filter. Preferably, the filter parameters should be tunable to allow for different dynamics to be modeled.

In any event, it is important to note that the reconciliation process implemented by the pipe simulation module 306 adjusts or calculates flow from the exit of the upstream module 302 to the output of the downstream module 304 based on the pressures at these points, as determined by the models within the simulation modules 302 and 304. Moreover, because the pipe algorithm in the pipe simulation module 306 uses a pressure associated with the downstream element, in this case the outlet of the downstream element 304, to calculate the flow exiting the upstream element, and in some cases to adjust the pressure at the output of the upstream element, changes in the operation of the downstream element 304 are inherently communicated to the upstream element, which will use the mass flow rate and output pressure in its next computational cycle. Thus, changes in variables, such as mass flow, pressures, temperatures, etc. in a downstream element are propagated upstream during successive simulation cycles, and are reflected in the modeling of the upstream element during the next simulation execution cycle of the upstream element.

Figure 5:
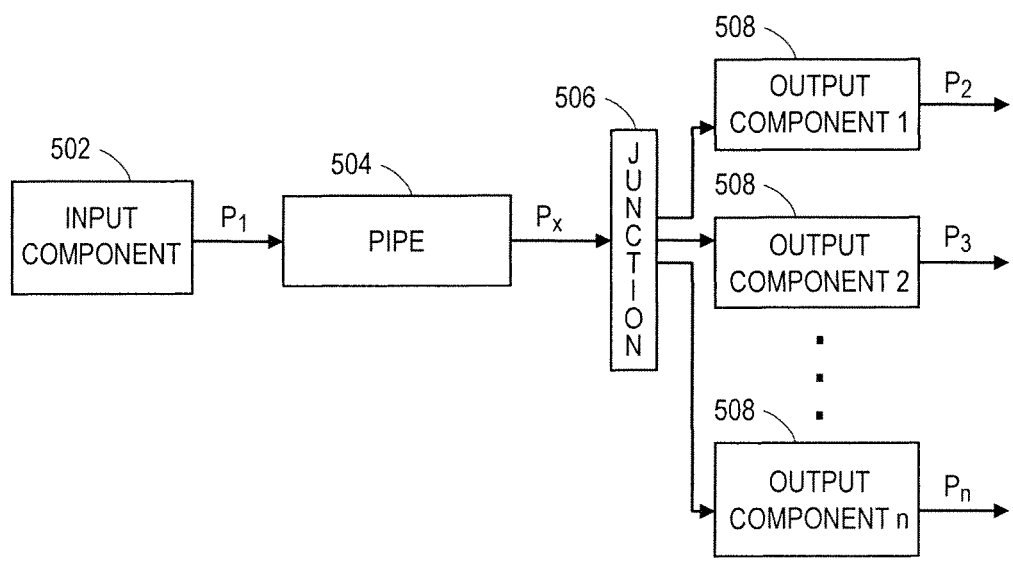
FIG. 5 illustrates a pipe simulation module that is communicatively connected between a plant simulation module and a junction module in the form of a splitter simulation module which is, in turn, connected to three downstream plant element simulation modules and that performs mass flow balancing between the upstream and downstream plant element simulation modules.

A more generic modeling example will now be illustrated in conjunction with FIG. 5 in which a pipe simulation module is used to model the operation of a flow splitter device in conjunction with downstream components. In this case, an inlet component (upstream component) 502 is connected to the inlet of a pipe element 504, and the outlet of the pipe element 504 is connected to a splitting (or mixing) junction element 506. The splitting junction element 506 is modeled such that all pressure measurements at the junction inlets and outlets are the same. As in the example of FIG. 4, the input simulation component 502 and all of the output simulation components 508 (downstream of the splitting junction 506) compute or perform their associated model calculations individually in a sequential manner. These components can represent or model any equipment or any section of equipment including an actual pipe itself. In order to formulate a set of easily solvable equations, and without the loss of generality, it is assumed that directions of all of the flows around the junction 506 are known a priori. The following derivation assumes flow directions as shown by the arrows in FIG. 5.

It is assumed that the mass flow at the inlet of the pipe element 504 and at the outlet of the pipe element 504 are equal at steady state. This flow value is also equal to the summation of all of the junction outlet flows (mass balance) of the junction element 506. Thus:

$$\dot{m}_1 = \sum_{i=2}^{n} \dot{m}_i \quad (1A)$$

The equation for calculating the pipe inlet flow is the same as equation (2) above, and can be re-written in this case as follows:

$$\dot{m}_1 = K_1 \cdot \sqrt{P_1 - P_x} \quad (2A)$$

Where $K_1$ is the pipe conductance.

The equation for calculating each of the mass flows after the junction split is derived in a manner similar to equation (3).

$$\dot{m}_i = K_i \sqrt{P_x - P_i} \quad (i=2, \ldots, n) \quad (3A)$$

where $K_i$ is the corresponding equipment conductance.

Therefore, according to equation 1A, $$K_1 \cdot \sqrt{P_1 - P_x} = \sum_{i=2}^{n} K_i \cdot \sqrt{P_x - P_i} \quad (5)$$

This equation has to rely on a nonlinear solver to obtain the value of $P_x$. One method of solving this equation for $P_x$ is as follows:

Step 1: Initialization

If the computation is in the first pass, then $$P_x = \frac{\sum_{i=1}^{n}(P_i \cdot K_i^2)}{\sum_{i=1}^{n} K_i^2} \quad (6)$$

Otherwise, an initial $P_x(k) = P_x(k-1)$.

Step 2: Linearization

Linearization allows solving for an approximate $P_x$ in a quick manner. This quickly solved $P_x$ can be used as the initial value for the next step in the nonlinear solving process, or it can be used directly as the final solution.

Step 2.1: Choose $P_x(k)$ obtained from Step 1 as a linearization operating point. Let $P_x(k)$ be defined as $P_0$. Also, for notational convenience, let $f = \dot{m}$. In this case, flow rates at the linearization operating point can be calculated as:

$$f_{10} = K_1 \sqrt{P_1 - P_0}$$

$$f_{i0} = K_i \sqrt{P_0 - P_i} \quad (i=2, \ldots, n)$$

Where $P_1$ and $P_i$ are the latest available calculations of the pressure variables (depending on the algorithm execution order).

Step 2.2: For flow rates within the linearization region:

$$K_1^2(P_1 - P_x) = f_1^2 \approx f_{10}^2 + 2f_{10}(f_1 - f_{10}) \Rightarrow f_1$$
$$= \frac{K_1^2(P_1 - P_x) + f_{10}^2}{2f_{10}}$$

$$K_i^2(P_x - P_i) = f_i^2 \approx f_{i0}^2 + 2f_{i0}(f_i - f_{i0}) \Rightarrow f_i$$
$$= \frac{K_i^2(P_x - P_i) + f_{i0}^2}{2f_{i0}} \quad (i=2, \ldots, n)$$

According to equation 1A:

$$\frac{K_1^2(P_1 - P_x) + f_{10}^2}{2f_{10}} = \sum_{i=2}^{n} \frac{K_i^2(P_x - P_i) + f_{i0}^2}{2f_{i0}}$$

$P_x$ can now be solved as:

$$P_x = \frac{\left\{\sum_{i=1}^{n}\left(\frac{K_i^2 P_i}{2f_{i0}} + \frac{f_{i0}}{2}\right)\right\}}{\sum_{i=1}^{n}\frac{K_i^2}{2f_{i0}}}$$

This $P_x$ can be used as the solution directly, or can be used as the initial condition for the next step.

Step 3: Use $P_x$ solved from previous step as an initial condition, and solve equation (5) for $P_x$. Of course, once the value $P_x$ is computed, the mass flows through the pipe element 504 and each of the downstream elements 508 can be easily determined.

As a special case of the generic situation presented above, a more common scenario is a three-way junction used in piping configurations. In this situation, the value of $P_x$ can be obtained in a closed analytical form. The computational derivation can be outlined as following:

Beginning with the mass balance equation:

$$K_1\sqrt{P_1-P_x}=K_2\sqrt{P_x-P_2}+K_3\sqrt{P_x-P_3}$$

the equation below is obtained:

$$A \cdot P_x^2 + B \cdot P_x + C = 0$$

Where:
$A=K_1^4+K_2^4+K_3^4+2K_1^2K_2^2+2K_1^2K_3^2-2K_2^2K_3^2$
$B=-2\cdot(K_1^4P_1+K_2^4P_2+K_3^4P_3+K_1^2K_2^2P_1+K_1^2K_3^2P_1+K_2^2K_1^2P_2+K_3^2K_1^2P_3-K_2^2K_3^2P_1-K_2^2K_3^2P_3)$
$C=K_1^4P_1^2+K_2^4P_2^2+K_3^4P_3^2+2K_1^2K_2^2P_1P_2+2K_1^2K_3^2P_1P_3-2K_2^2K_3^2P_2P_3$ $P_x$ can then be solved using the standard quadratic equation formula:

$$P_x = \frac{-B \pm \sqrt{B^2 - 4AC}}{2A}$$

For a splitter junction in this case, the minus sign in front of the square root in the above equation is selected.

Although the above equation is written for a splitting junction, a mixing junction algorithm can be written in a straightforward and similar manner, except the plus sign in front of the square root is selected. Of course, once the pressure $P_x$ has been solved, the mass flows can be computed to reconcile mass flow from the upstream element through the splitting junction to the downstream elements.

While a couple of example mass flow rate and pressure balance algorithms have been described herein for use in pipe simulation modules, similar mass flow and pressure balance algorithms can be developed for other types of components to be used in a simulation system as described herein, including for example, tanks, heat exchangers, etc.

In one case, a tank model may implement pressure and flow rate balancing using downstream component variables to perform pressure, temperature or mass flow balancing between or across adjacent simulation modules. In the tank model, the mass balance equation may be written as:

$$dM/dt = m\_in - m\_out$$

where "d" stands for derivative, M is the total mass in the tank, t is the time, m_in is the flow that comes into the tank, and m_out is the flow going out of the tank.

Calculation of the inlet and outlet flows can be performed by the following piping formulas:

$$m\_in = K_1 * (P\_in - P\_tank\_in)^{1/2}$$

$$m\_out = K_2 * (P\_tank\_out - P\_next)^{1/2}$$

where $K_1$ and $K_2$ are the inlet flow conductance of the tank unit and the next connected unit, P_in is the inlet pressure at the tank inlet pipe inlet, P_tank_in is the pressure at the tank inlet pipe outlet, P_tank_out is the pressure at the tank outlet pipe inlet, and P_next is the pressure at the tank outlet pipe outlet. In this case, the outlet pipe is the next downstream module. Thus, here, P_next is the pressure information for the downstream unit illustrating again in this case how downstream information gets incorporated by the tank simulation module to thereby provide feedback from downstream elements to upstream elements.

In any event, sets of mass flow rate and pressure and temperature balance equations can be derived and used for other various other simulation components, including sensors (e.g., pressure, flow, temperature, etc. sensors), boundary conditions from the left (upstream), boundary conditions to the right (downstream), a general motor, a general tank, a general pipe (for steam, water, etc.), a junction, (general water/steam junction), a duct (e.g., for air or flue gas), a general air/flue gas junction, a general purpose valve (e.g., for steam/water), a general purpose damper (e.g., for air/gas), a general purpose centrifugal pump, a general purpose centrifugal fan (for use in either forced draft or induced draft systems) a general purpose axial fan, a furnace (of many different types), a steam drum, a popular horizontal feedwater heater, a deaerator, a heat exchanger (for a superheater and/or a reheater), a general purpose condenser, a cooling tower, a pulverizer (e.g., a general purpose bowl mill), a turbine, a mechanical shaft (lumped), an electrical generator, an electric circuit breaker, a synchronization scope, a flow splitter, a flow splitter junction, a flow mixer, a flow mixer junction, a steam seal condenser, a check valve, an air pre-heater or any other number of plant elements.

While the above simulation approach works well in steady state conditions to enable accurate distributed simulation using a set of distributed simulation modules without the need for a central coordinator, it is desirable to modify this technique slightly to account for or enable accurate simulations during dynamic conditions. In particular, in some instances, it may be beneficial to implement what is referred to herein as a transient mass storage relay (TMSR) technique when performing a distributed simulation using the piping concept described above. The TMSR technique is particularly useful in handling total mass imbalance problems that might be encountered when performing the sequential simulation mechanism described above during dynamic conditions and/or when simulating closed loop or circular systems.

Figure 6:
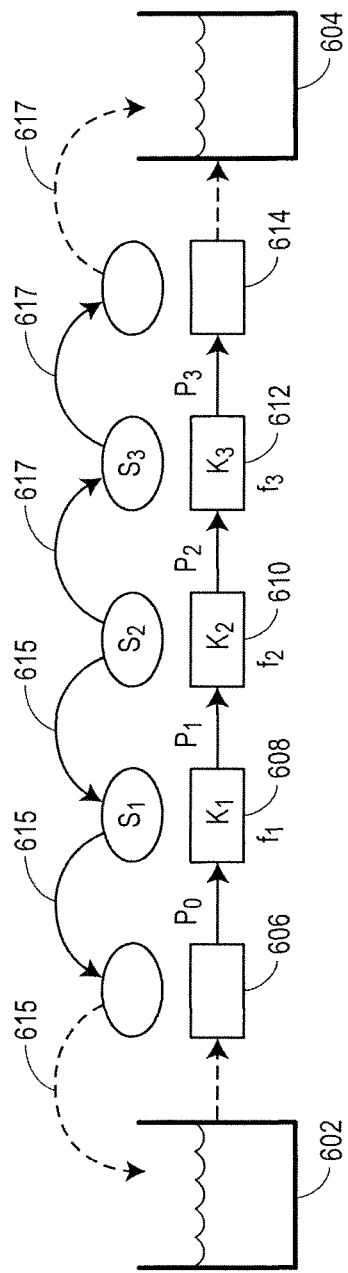
FIG. 6 illustrates a set of non-mass storage simulation modules connected between upstream and downstream mass storage simulation modules to illustrate a manner of accounting for mass discrepancies arising from simulating mass flow during transient or dynamic conditions within a plant.

The need for and the manner of implementing the TMSR technique is illustrated in more detail using the simulation diagram 600 of FIG. 6 in which mass flow travels or flows from an upstream storage device 602 (a tank is used as an example here) to a downstream storage device 604 (a second tank is used as an example here) through a series of non-storage devices 606, 608, 610, 612, 614. Here, pipes are used as examples of the non-storage devices 608-612, although other types of devices that do not perform mass storage could be used in the simulation as well or instead. Without loss of generality, the conductances of the pipes (pipe 1, pipe 2 and pipe 3, respectively) associated with the pipe simulation elements 608-612 are illustrated in the example system of FIG. 6 as $K_1$, $K_2$ and $K_3$, respectively, the flow through the pipes pipe 1, pipe 2 and pipe 3 are denoted as $f_1$, $f_2$, and $f_3$, respectively, and the inlet and outlet pressures of the three pipes associated with the simulation elements 608-612 are denoted as $P_0$, $P_1$, $P_2$ and $P_3$, respectively.

At any given moment, the outlet flow of one particular pipe should be equal to the inlet flow of the connected downstream pipe, i.e., $f_{i\_out} = f_{(i+1)\_in}$. Within any given computer sampling time, the execution order is assumed to follow the order of device line-up from the upstream elements to the downstream elements. For example, the simulation module 608 for pipe 1 would be executed before the simulation module 610 for pipe 2, etc. In the following discussion, a top hat denotes the current updated calculation result as opposed to a result computed at a previous sampling time. For example, $\hat{P}$ denotes the current updated value as opposed to a previously calculated value of P.

Based on definitions set forth above, the calculations of pressure and flow for each individual component, beginning from pipe 1, can be laid out as follows (in the order of execution):

$$\hat{P}_1 = \frac{K_1^2 \hat{P}_0 + K_2^2 P_2}{K_1^2 + K_2^2} \quad (7)$$

$$F_{1\_in} = K_1 \sqrt{\hat{P}_0 - \hat{P}_1}$$

$$F_{1\_out} = K_2 \sqrt{\hat{P}_1 - P_2}$$

$$\hat{P}_2 = \frac{K_2^2 \hat{P}_1 + K_3^2 P_3}{K_2^2 + K_3^2} \quad (8)$$

$$F_{2\_in} = K_2 \sqrt{\hat{P}_1 - \hat{P}_2}$$

$$F_{2\_out} = K_3 \sqrt{\hat{P}_2 - P_3}$$

In ideal case:

$$F_{1\_in} = F_{1\_out} = F_{2\_in} = F_{2\_out}$$

However, this condition is only true during steady state. During a dynamic transition, $P_2 \neq \hat{P}_2$. Therefore, comparing sets of equations (7) and (8) leads to $$F_{1\_in} = F_{1\_out} \neq F_{2\_in} = F_{2\_out}$$

This condition of course produces mass imbalances during dynamic transients and such imbalances will be reflected in the simulation in one or both of two manners. First, the simulation may end up with slightly different solution than a simulation that solves all of the equations simultaneously. In this case, the amount of out-of-balanced mass may be shifted (or appears to be "leaked") from one storage device to another storage device. Second, for a closed-circulation system, this situation may operate to make it appear that the total mass in the system increases or decreases over a long period of sustained dynamic transient. As the chosen sampling time gets smaller, the amount of mass imbalance starts to diminish accordingly. However, an arbitrary small sampling time is prohibited (i.e., is not possible to obtain) by an actual computer implementation.

To correct for this mass imbalance artifact arising during dynamic transients, the TMSR technique introduces a transient mass storage for each non-storage component (e.g., for each pipe). For example, the transient mass storage for pipe 2 can be defined as:

$$S_2 = F_{1\_out} - F_{2\_out}$$

Once defined, the transient mass storage can be handled as follows. During a dynamic transient (for example, when a valve moves), there will always be some amount of mass imbalance. If the transient mass storage S for an element (e.g., a pipe) is positive, then the simulation module for that element dumps this mass storage to the immediate upstream device, while if the transient mass storage S is negative, then the simulation system dumps this transient mass to the immediate downstream device. After a non-storage device dumps its transient mass storage to an upstream or a downstream device, the device resets its transient mass storage associated therewith to zero. (Of course, an upstream device means the device in the direction against the normal flow path and a downstream device means the device in the direction of the normal flow path). Every algorithm (simulation module) for each non-storage device performs this same procedure during each execution cycle so that, eventually, the transient mass storage reaches a mass storage device (e.g., a tank). Here, a mass storage device is a component (having a simulation algorithm) that can explicitly process the equation dM/dt=flow_in −flow_out (where M is the total mass inside that device). For example, simulation modules for tanks, drums, heat exchangers, etc. can perform this operation. In this manner, all lost or gained mass leakages (in non-storage devices) will return to where this mass belongs (i.e., in a storage device), and the user will not see these balancing actions from the front end because all other piping calculations continue as usual at the same time. Thus, in the example of FIG. 6, a positive transient mass storage $S_2$ calculated in the pipe simulation element 610 will be transferred to the simulation element 608 (upstream), as illustrated by the arrow 615. Because the simulation element 608 is simulating anon-storage device (e.g., a pipe), during its next execution cycle, the simulation element 608 dumps its positive transient mass storage $S_1$ to the upstream simulation element 606. Of course, the transient mass storage $S_1$ will include transient mass storage dumped from the simulation module 610 in the previous cycle as well as any new mass imbalances calculated for the current execution cycle of simulation module 608. Thus, the transient mass storage $S_1$ may be different than the transient mass storage $S_2$. As illustrated by the upstream arrows 615, the transient mass storage $S_2$, when positive, is eventually transferred to the simulation module 602, which simulates a mass storage device (e.g., a tank) which can process this transient mass during its next execution cycle.

In a similar manner, a negative transient mass storage $S_2$ calculated in the pipe simulation element 610 will be transferred to the simulation element 612 (downstream), as illustrated by the arrows 617. Because the simulation element 612 is simulating anon-storage device (e.g., a pipe), during its next execution cycle, the simulation element 612 dumps its negative transient mass storage $S_3$ (which may be the transient mass storage $S_2$ plus additional transient mass storage calculated as a result of the operation of the pipe simulation module 612) to the downstream simulation element 614. As illustrated by the downstream arrows 617, the transient mass storage $S_2$, when negative, is eventually transferred to the simulation module 604, which simulates amuse storage device (e.g., a tank) which can process this transient mass during its next execution cycle.

The rule for this transient mass storage relay approach, when used in the system of FIG. 6, can be simply summarized by the following pseudo-code.

```
IF Ŝ₂ > 0
    THEN
            Ŝ₁ = S₁ + Ŝ₂
            Ŝ₂ = 0
    ELSE
            Ŝ₃ = S₃ + Ŝ₂
            Ŝ₂ = 0
```

Figure 7:
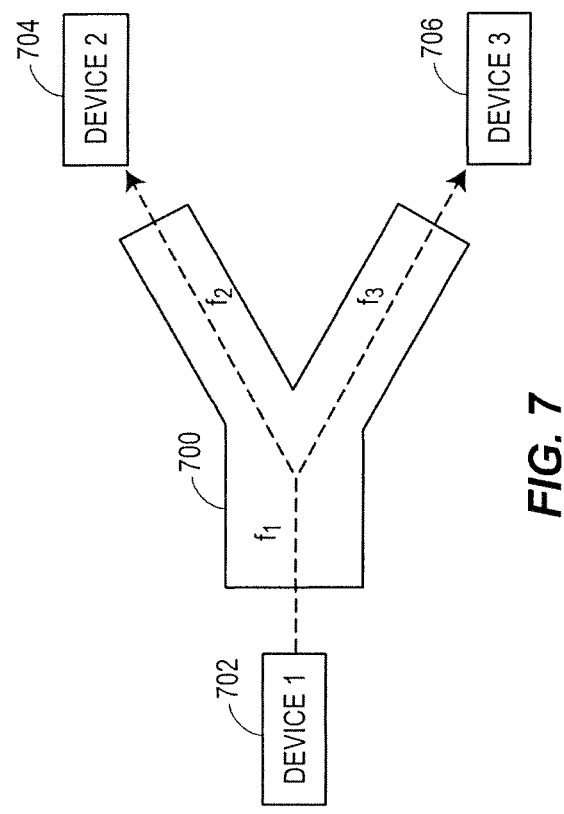
FIG. 7 illustrates a flow junction simulation module, in the form of a splitter, disposed between upstream and downstream plant element simulation modules to illustrate a manner of accounting for mass discrepancies arising from mass flow during transient or dynamic conditions through the splitter.

The TMSR technique can also be used in a splitter device, such as that illustrated in FIG. 5. In particular, FIG. 7 illustrates a splitter device 700 which connects an input device 702 (Device 1) to two downstream output devices 704, 706 (Devices 2 and 3). Flow $f_1$ comes into the splitter junction 700 from the input device 702 and splits into two outgoing flow streams labeled as flows $f_2$ and $f_3$. Here, the transient mass storage in each of the devices 702, 704 and 706 can be denoted as $S_1$, $S_2$ and $S_3$, respectively, and the transient mass storage in the splitter can be denoted as S. The transient mass storage in the splitter junction is then:

$$S = f_1 - f_2 - f_3$$

A TMSR rule for this splitter junction module can then be described by the following pseudo code:

```
IF Ŝ > 0
              Ŝ₁ = S₁ + Ŝ
   THEN
              Ŝ = 0
   ELSE
              Ŝ₂ = S₂ + (f₂/f₁)Ŝ
              Ŝ₃ = S₃ + (f₃/f₁)Ŝ
              Ŝ = 0
```

In the above described example, the transient mass storage determined in the splitter junction 700 gets relayed to the downstream devices 704 and 706 in a manner that is proportionally distributed according to the outlet branch flow as a percentage of the total inlet flow. Of course, the TMSR approach described herein can similarly be applied to a mixer junction, as well as to any junctions or other devices that have more than two inlets or outlets.

As illustrated in FIG. 3, each of the distributed simulation modules 42 includes one or more memories 210 used for use in communications between adjacent (i.e., immediately connected upstream and downstream) simulation modules, to enable direct communications between these modules without the use of a central coordinator. In particular, these direct communications can be implemented to provide data calculated in or associated with one simulation module that is needed in the adjacent simulation module (upstream and/or downstream) to perform the modeling tasks in the adjacent simulation module. This data may include, for example, simulation module inputs and outputs and various internal parameters including, for example, calculated input and output pressures (e.g., pressures $P_0$, $P_1$, $P_2$, $P_n$, and $P_x$ of FIGS. 4 and 5), flow rates (e.g., mass flow rates through the pipe and downstream components of the pipes in FIGS. 4 and 5, the flow rates $f_1$, $f_2$, etc. of FIGS. 6 and 7), transient mass storage values (e.g., transient mass storage values $S_1$, $S_2$, etc. of FIG. 6), temperatures, or any other process variable values, set points, configuration settings, etc. associated with one simulation element that is needed by an adjacent simulation element to perform modeling using the concepts described above.

In particular, the memories 210 are used by the simulation modules or the processors executing the simulation modules to perform local memory exchanges between different drops or different simulation modules. The mechanism used for this local memory exchange task may be similar to a task running on the processor that performs a copy to a backup (which task occurs at regularly scheduled intervals and simply copies data to a known memory location for backup purposes). In this case, however, the processor executing a particular simulation module copies predetermined data values (e.g., input and/or output pressures, mass flow values, transient mass storage values, etc.) to a known memory location that is associated with (and used by) an upstream or a downstream simulation module. Of course, different data may be copied to different simulation modules, as it is only necessary to copy the data from one simulation module to an upstream or downstream simulation modules that is needed by the upstream or downstream simulation module. The data that will be copied in any particular case can be set up or specified during configuration of the simulation system.

Thus, instead of copying a large amount of local data between a primary location and a back-up drop, the simulation communication technique described herein requires only a small amount of local memory data transfer, mainly for simulation algorithms that connect between drops.

As will be understood, when simulation modules are disposed in separate processing devices, or even in the same processing device, adjacent simulation modules communicate data upstream and downstream by simply writing the data into a memory location assigned to or associated with the respective upstream or downstream simulation module, making that data immediately available to the upstream or downstream simulation module when that simulation module executes. Of course, data can be communicated to a memory within the same processing device or to a memory in a different processing device, via a communication network disposed between the two different devices. This communication mechanism is simple, as each simulation module communicates the most recent data from that simulation module to the upstream and downstream simulation modules which use that data, without the need for a large amount of communication overhead and without the need to send a large amount of data between any two devices (or even between any two simulation modules).

Moreover, the process of communicating using the local memory drops 210 can be implemented in the same manner that an actual process controller performs a copy to backup task, in that this communication task runs in parallel to all other control tasks. However, in a virtual controller (i.e., a simulated controller), the copy to backup task is not needed and therefore this task can be replaced by a simulation local memory copy task (referred to herein as the SIMLMCPY task) which executes periodically in the processor as a dedicated background task to copy the needed data between simulation modules in the virtual controller device or between different drops having adjacent simulation modules therein.

Figure 8:
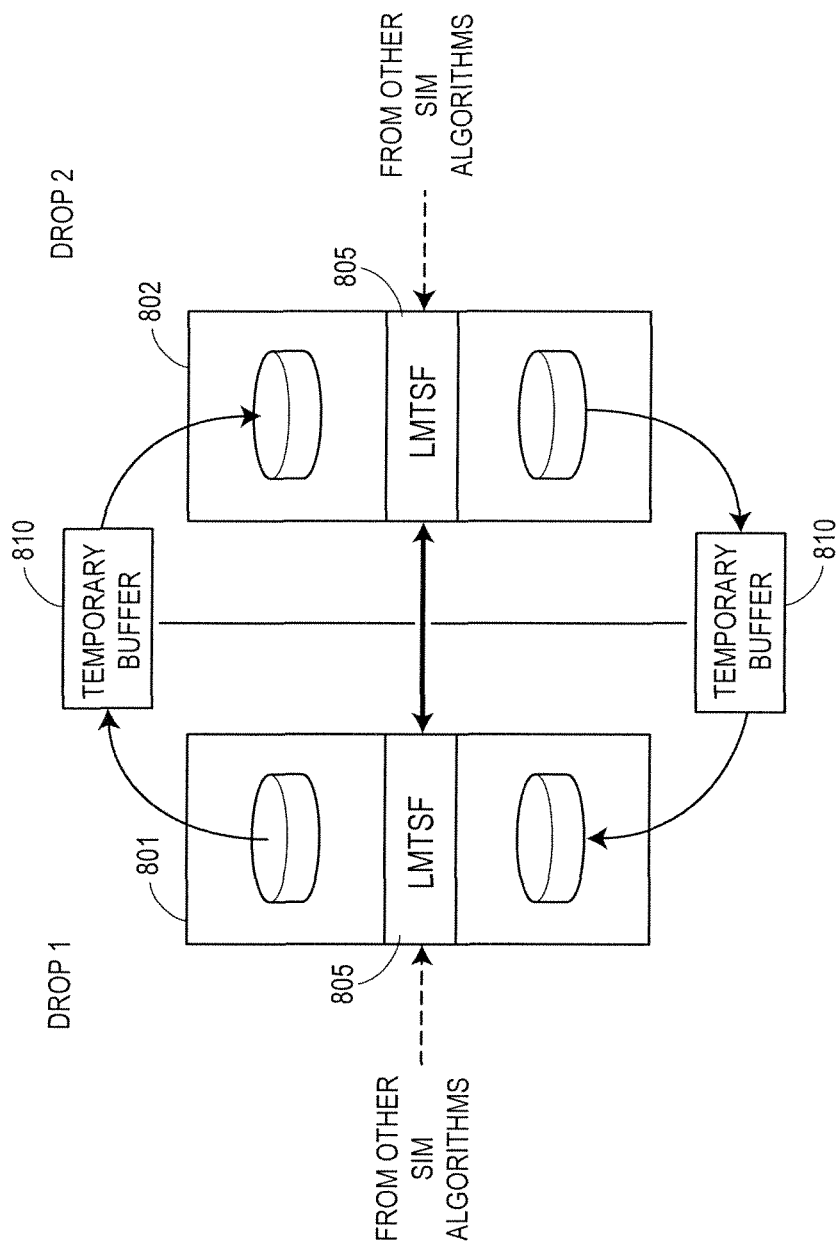
FIG. 8 illustrates a manner of communicating between adjacent distributed simulation modules that reside in different distributed control system drops that can be used in the distributed simulation system of FIG. 1.

In one case, this communication technique may be implemented by the following procedure illustrated in conjunction with FIG. 8 which illustrates the local memories 210 of two adjacent simulation modules 801 and 802 which are disposed in different drops (e.g., different processing devices). A dedicated local memory transfer algorithm (LMTSF) 805 is created for and is associated with each of the simulation modules 801 and 802. The LMTSF algorithm 805 is used for connecting simulation drops only, and acts like a memory buffer. The LMTSF algorithm 805 is placed in both the originating drop and the receiving drop and the two algorithms know each other by a unique identification (ID). This ID is not however, an SID or an LID. Instead, this ID number may be placed into each algorithm 805 (perhaps in a certain field) by the user, at the time that the simulation system is created or at the time that the simulation modules 801 and 802 are created or downloaded to the drops. Upon download, all LMTSF algorithms 805 and their associated ID numbers register with a simulation local memory copy (SIMLMCPY) task run in the processor, no that the SIMLMCPY task performs local memory exchange using the LMTSF algorithm when the SIMLMCPY task runs as a background task in the processor.

Thereafter, at each loop-time, the SIMLMCPY task in the processor of a drop copies the local memory from each originating LMTSF to a temporary buffer (illustrated as buffers 810 in FIG. 8), and then to the corresponding receiving LMTSF. The same action is performed between the receiving LMTSF to the originating LMTSF thereby assuring that each originating and receiving pair (upstream and downstream simulation modules) communicate the needed data to one another. Moreover, this process is performed between each pair of adjacent simulation modules, so that, between each execution cycle of the simulation system, each set of adjacent simulations modules communicates data therebetween, which data is needed or used by the receiving simulation module to perform modeling during the next execution cycle. This communication system eliminates the need for a central coordinator to track communication flow or process flow between all of the simulation modules in different drops, as each simulation knows and is able to communicate directly with the simulation modules connected immediately upstream and downstream of that simulation module.

Of course, the communication scheme described above assumes that the SIMLMCPY task can sort through all of the simulation algorithms in a particular and find the connected LMTSF algorithms by their unique identification numbers. This communication scheme also assumes that the SIMLMCPY task can access the local memory space of the LMTSF algorithm of each simulation module by the drop number and algorithm SID, and then the LID. Of course, other manners of performing communication between adjacent simulation modules can be used as well or instead to assure communications between the different simulation modules associated with the distributed simulation system.

When implemented, any of the simulation software and distributed simulation modules described herein may be stored in any compute readable memory such as on a magnetic disk, a laser disk, or other storage medium, in a RAM or ROM of a computer or processor, etc. Likewise, this software or these modules may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A distributed simulation system for simulating the operation of a set of physical plant elements through which mass flows, comprising:
   a computer network including a plurality of drops and a communication network that communicatively couples the plurality of drops, wherein each of the plurality of drops includes a processor; and
   a multiplicity of processor implemented simulation modules, each of the multiplicity of simulation modules including a process model that models the operation of a different one of the physical plant elements, wherein a first one of the simulation modules is an upstream simulation module located in a first drop of the plurality of drops that models the operation of a first one of the set of physical plant elements and a second one of the simulation modules is a downstream simulation module located in a second drop of the plurality of drops different from the first drop that models the operation of a second one of the set of physical plant elements disposed downstream of the first one of the set of physical plant elements;
   wherein the downstream simulation module operates via a processor to communicate a value of a process variable calculated by the downstream simulation module to the upstream simulation module, and the process model of the upstream simulation module operates via a processor to use the value of the process variable calculated by the downstream simulation module to produce an output associated with the operation of the physical plant element modeled by the upstream simulation module, so that the upstream and downstream simulation modules communicate calculated process variable information between one another to perform simulation of mass flow between the first physical plant element and the second physical plant element.

2. The simulation system of claim 1, wherein the upstream simulation module implements one or more mass flow balancing equations to determine an input to the downstream simulation module.

3. The simulation system of claim 2, wherein the input to the downstream simulation module comprises a pressure value at the input of the downstream one of the physical plant elements modeled by the downstream simulation module.

4. The simulation system of claim 2, wherein the input to the downstream simulation module comprises a mass flow rate associated with the input of the second one of the physical plant elements modeled by the downstream simulation module.

5. The simulation system of claim 1, wherein the upstream simulation module includes a model that models the operation of a physical pipe element within the plant.

6. The simulation system of claim 1, wherein the upstream simulation module includes a model that models the operation of a physical tank element within the plant.

7. The simulation system of claim 1, wherein the process model of the upstream simulation module models the relationship between pressure and flow as a quadratic relationship.

8. The simulation system of claim 1, wherein the upstream simulation module is associated with a first physical device that does not perform mass storage, and wherein the upstream simulation module includes a temporary mass flow storage algorithm that determines an imbalance in mass flow between the input and output of the first physical device as a result of a dynamic change, and that stores the value of imbalance in mass flow.

9. The simulation system of claim 8, wherein the temporary mass flow storage algorithm sends the stored imbalance in mass flow determined during a particular execution cycle of the upstream simulation module to another simulation module and sets the stored imbalance in mass flow within the upstream simulation module to zero.

10. The simulation system of claim 9, wherein the temporary mass flow storage algorithm sends the stored imbalance in mass flow to a further upstream simulation module when the value of the stored imbalance in mass flow is greater than zero, and wherein the temporary mass flow storage algorithm sends the stored imbalance in mass flow to a further downstream simulation module when the value of the stored imbalance in mass flow is less than zero.

11. The simulation system of claim 1, wherein at least one of the drops includes a communication routine that implements communications between a particular simulation module located at the at least one of the drops and another upstream or downstream simulation module located at a different drop as a background process.

12. The simulation system of claim 1, wherein at least one of the simulation modules located at a particular drop stores a communication algorithm that operates to provide communication of variables from the one of the simulation modules to another upstream or downstream simulation module, wherein the communication algorithm stores a unique identifier for the upstream simulation module that is used to communicate information to the another upstream or downstream simulation module.

13. The simulation system of claim 1, wherein the process model of the upstream simulation module model is a first principles model.

14. A method of simulating the operation of a set of physical plant elements through which mass flows, comprising:
creating, via a processor, a set of separately executable simulation modules, each of the set of simulation modules including a process model that models the operation of a different one of the physical plant elements;
storing, using a processor, different ones of the separately executable simulation modules at a plurality of communicatively interconnected drops in a computer network, such that a first one of the separately executable simulation modules is located in a different drop than a second one of the set of separately executable simulation modules;
wherein the step of storing the separately executable simulation modules includes storing a set of adjacent simulation modules to include an upstream simulation module that models a first one of the physical plant elements, and a downstream simulation module that models a second one of the physical plant elements disposed downstream of the first one of the physical plant elements;
operating, via a processor, the downstream simulation module to communicate a value of a process variable calculated by the downstream simulation module to the upstream simulation module; and
operating, via a processor, the process model of the upstream simulation module to use the value of the process variable calculated by the downstream simulation module to produce an output associated with the operation of the physical plant element modeled by the upstream simulation module to perform mass flow balancing between the upstream simulation module and the downstream simulation module.

15. The method of simulating the operation of a set of physical plant elements of claim 14, wherein the upstream simulation module is associated with a physical pipe element.

16. The method of simulating the operation of a set of physical plant elements of claim 14, wherein the upstream simulation module implements one or more mass flow balancing equations to determine a pressure or temperature input to the downstream simulation module.

17. The method of simulating the operation of a set of physical plant elements of claim 16, including using one or more mass flow balancing equations that model the relationship between pressure and mass flow as a quadratic relationship.

18. The method of simulating the operation of a set of physical plant elements of claim 14, further including using a particular one of the set of simulation modules to simulate the operation of a first physical plant element that does not perform mass storage, and including determining within the particular one of the set of simulation modules an imbalance in mass flow between an input and an output of the first physical device as a result of a dynamic change, and temporarily storing the value of imbalance in mass flow as associated with the particular one of the set of simulation modules.

19. The method of simulating the operation of a set of physical plant elements of claim 18, further including sending the stored imbalance in mass flow determined during a first execution cycle of the particular one of the set of simulation modules to one or more immediately adjacent simulation modules during one or more consecutive execution cycles and resetting the stored imbalance in mass flow of the particular one of set of simulation modules to zero.

20. The method of simulating the operation of a set of physical plant elements of claim 18, wherein storing the simulation modules includes storing a set of simulation modules that includes a first simulation module associated with a first physical plant element that does not perform mass storage communicatively disposed downstream of a second simulation module and communicatively disposed upstream of a third simulation module, wherein the second and third simulation modules are associated with physical devices that perform mass storage, and further including determining at the first simulation module, an imbalance in mass flow between an input and an output of the first physical device as a result of a dynamic change, and sending the imbalance in mass flow determined by the first simulation module to the second simulation module for processing in the second simulation module when the imbalance in mass flow is positive and sending the imbalance in mass flow determined by the first simulation module to the third simulation module for processing in the third simulation module when the imbalance in mass flow is negative.

21. The method of simulating the operation of a set of physical plant elements of claim 14, wherein storing the simulation modules includes storing a set of simulation modules that includes a first simulation module associated with a first physical plant element that does not perform mass storage, and a second simulation module associated with a second physical device that performs mass storage, and further including determining at the first simulation module, an imbalance in mass flow between an input and an output of the first physical device as a result of a dynamic change, and sending the imbalance in mass flow determined by the first simulation module to the second simulation module for processing in the second simulation module.

22. The method of simulating the operation of a set of physical plant elements of claim 21, wherein sending the imbalance in mass flow determined by the first simulation module to the second simulation module includes sending the imbalance in mass flow from the first simulation module to the second simulation module through one or more intermediate simulation modules, wherein each of the intermediate simulation modules is associated with a physical device that does not perform mass storage.

23. The method of simulating the operation of a set of physical plant elements of claim 21, wherein storing the simulation modules includes storing the second simulation module communicatively connected upstream of the first simulation module and wherein sending the imbalance in mass flow determined by the first simulation module to the second simulation module includes sending the imbalance in mass flow determined by the first simulation module upstream to the second simulation module when the imbalance in mass flow determined by the first simulation module is positive.

24. The method of simulating the operation of a set of physical plant elements of claim 21, wherein storing the simulation modules includes storing the second simulation module communicatively connected downstream of the first simulation module and wherein sending the imbalance in mass flow determined by the first simulation module to the second simulation module includes sending the imbalance in mass flow determined by the first simulation module downstream to the second simulation module when the imbalance in mass flow determined by the first simulation module is negative.

25. The method of simulating the operation of a set of physical plant elements of claim 14, further including implementing communications between a particular simulation module located at a first drop and an upstream or a downstream simulation module located at a second drop as a background process in each of the first and second drops.

26. The method of simulating the operation of a set of physical plant elements of claim 14, including storing a unique identifier in each simulation module and using the unique identifiers to communicate information between pairs of immediately adjacent upstream or downstream simulation modules to thereby provide for direct communications between each pair of immediately adjacent simulation modules.

27. A distributed simulation system for simulating the operation of a set of physical plant elements through which mass flows, comprising:
a multiplicity of processor implemented simulation modules, each of the multiplicity of simulation modules including a process model that models the operation of a different one of the physical plant elements, wherein a first one of the simulation modules and a second one of the simulation modules are located in different ones of a set of drops of a computer network and communicate with one another over a communication network associated with the computer network;
wherein, during operation of the simulation system, each of the simulation modules is directly communicatively coupled to one or more upstream or downstream simulation modules in an order in which the physical plant elements associated with the simulation modules are physically coupled to each other to implement mass flow, so that adjacent pairs of communicatively coupled simulation modules communicate information directly to each other;
wherein an adjacent pair of communicatively coupled simulation modules includes an upstream simulation module that is upstream from a downstream simulation module, the downstream simulation module operating via a processor to communicate process variable information calculated by the downstream simulation module to the upstream simulation module and the upstream simulation module implementing via a processor a process model that performs a mass flow balancing equation to balance mass flow between the upstream simulation module and the downstream simulation module using the process variable information received from the downstream simulation module.

28. The distributed simulation system of claim 27, wherein the mass flow balancing equation models the relationship between pressure and mass flow as a quadratic relationship.

29. The distributed simulation system of claim 27, wherein the process model of the upstream simulation module determines an output of the upstream simulation module using pressure process variable information received from the downstream simulation module.

30. The distributed simulation system of claim 27, wherein the multiplicity of simulation modules includes a first simulation module associated with a first physical plant element that does not perform mass storage communicatively disposed downstream of a second simulation module and communicatively disposed upstream of a third simulation module, wherein the second and third simulation modules are associated with physical devices that perform mass storage, and wherein the first simulation module determines an imbalance in mass flow between an input and an output of the first physical device as a result of a dynamic change, and sends the imbalance in mass flow determined at the first simulation module to the second simulation module for processing in the second simulation module when the imbalance in mass flow is positive and sends the imbalance in mass flow determined by the first simulation module to the third simulation module for processing in the third simulation module when the imbalance in mass flow is negative.

31. The distributed simulation system of claim 27, wherein the multiplicity of simulation modules includes a first simulation module associated with a first physical plant element that does not perform mass storage, and a second simulation module associated with a second physical device that performs mass storage, and wherein the first simulation module determines an imbalance in mass flow between an input and an output of the first physical device as a result of a dynamic change, and sends the imbalance in mass flow determined by the first simulation module to the second simulation module for processing in the second simulation module.

32. The distributed simulation system of claim 31, wherein the first simulation modules sends the imbalance in mass flow determined by the first simulation module to the second simulation module via one or more intermediate simulation modules, wherein each of the intermediate simulation modules is associated with a physical device that does not perform mass storage.

33. The distributed simulation system of claim 27, further including a communication algorithm at each of the drops that performs communications between immediately adjacent simulation modules located in separate drops as a background task within the processor at the drop.

34. The distributed simulation system of claim 33, wherein at least one of the simulation modules at a particular drop stores an identifier uniquely identifying the one of the simulation modules and wherein the communication algorithm at the particular drop uses the identifier of the at least one of the simulation modules at the particular drop to perform communications between the at least one of the simulation modules at the particular drop and an immediately adjacent simulation module to the at least one of the simulation modules at a further drop, to thereby perform direct communications between adjacent pairs of simulation modules at different drops.

35. The distributed simulation system of claim 27, wherein the adjacent pair of communicatively coupled upstream and downstream simulation modules communicates data computed at the upstream simulation module from the upstream simulation module to the downstream simulation module and communicates data computed at the downstream simulation module to the upstream simulation module during each execution cycle of the simulation system.

* * * * *